(12) United States Patent
Colliou et al.

(10) Patent No.: US 10,570,811 B2
(45) Date of Patent: Feb. 25, 2020

(54) DEVICE FOR CONTROLLING A QUANTITY OF AIR FED INTO THE INTAKE OF A SUPERCHARGED INTERNAL COMBUSTION ENGINE AND COOLING THE EXHAUST—METHOD USING SUCH A DEVICE

(71) Applicant: IFP Energies nouvelles, Rueil-Malmaison (FR)

(72) Inventors: Thierry Colliou, Les Cotes d'arey (FR); Bruno Walter, Chassagny (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 122 days.

(21) Appl. No.: 15/577,188

(22) PCT Filed: May 12, 2016

(86) PCT No.: PCT/EP2016/060691
§ 371 (c)(1),
(2) Date: Nov. 27, 2017

(87) PCT Pub. No.: WO2016/188761
PCT Pub. Date: Dec. 1, 2016

(65) Prior Publication Data
US 2018/0171866 A1    Jun. 21, 2018

(30) Foreign Application Priority Data
May 28, 2015  (FR) ...................................... 15 54834

(51) Int. Cl.
*F02B 37/16*  (2006.01)
*F02B 37/02*  (2006.01)
*F02B 37/10*  (2006.01)

(52) U.S. Cl.
CPC .......... *F02B 37/168* (2013.01); *F02B 37/025* (2013.01); *F02B 37/10* (2013.01); *Y02T 10/144* (2013.01)

(58) Field of Classification Search
CPC .............................................. F02B 37/16–168
See application file for complete search history.

(56) References Cited

U.S. PATENT DOCUMENTS

| 3,102,381 A | 9/1963 | Tryhorn |
| 4,018,053 A | 4/1977 | Rudert et al. |

(Continued)

FOREIGN PATENT DOCUMENTS

| DE | 2438162 A1 | 2/1976 |
| DE | 2906182 A1 | 8/1980 |

(Continued)

OTHER PUBLICATIONS

International Search Report for PCT/EP2016/060691, dated Jul. 28, 2016; English translation submitted herewith (7 pgs.).

*Primary Examiner* — Laert Dounis
(74) *Attorney, Agent, or Firm* — Fitch, Even, Tabin & Flannery, L.L.P.

(57) ABSTRACT

The present invention relates to a device for controlling the amount of air fed to the intake of a supercharged internal-combustion engine, said engine comprising two exhaust gas outlets (32, 36) connected each to an exhaust manifold (30, 34) of a group of at least one cylinder (12₁, 12₂, 12₃, 12₄), said device comprising a supercharging device (38) including a turbocharger with a dual-inlet (50, 52) turbine (40) connected to said exhaust gas outlets, as well as an outside air compressor (44), and at least one duct for partial transfer of the compressed air from the compressor to the two turbine inlets. According to the invention, the partial transfer duct opens into the cylinder head at the exhaust valves and it (Continued)

comprises throttling means (74, 76) controlling the compressed air circulation in this duct.

10 Claims, 3 Drawing Sheets

(56) References Cited

U.S. PATENT DOCUMENTS

| | | | |
|---|---|---|---|
| 4,373,336 A | | 2/1983 | Horler et al. |
| 4,404,805 A | | 9/1983 | Curtil |
| 4,534,173 A | | 8/1985 | Tsukamoto |
| 4,559,784 A | * | 12/1985 | Jenny .................... F02B 33/44 |
| | | | 60/606 |
| 5,724,813 A | * | 3/1998 | Fenelon ................. F02B 37/10 |
| | | | 60/606 |

FOREIGN PATENT DOCUMENTS

| | | | | |
|---|---|---|---|---|
| DE | 10315148 A1 | * | 11/2004 | ............. F02B 37/04 |
| FR | 864443 A | | 4/1941 | |
| FR | 2202534 A5 | | 5/1974 | |
| FR | 2478736 A1 | | 9/1981 | |
| GB | 2438360 A | | 11/2007 | |
| JP | S57-200618 A | | 12/1982 | |
| JP | 05086877 A | * | 4/1993 | ............... F01N 3/02 |

* cited by examiner

DEVICE FOR CONTROLLING A QUANTITY OF AIR FED INTO THE INTAKE OF A SUPERCHARGED INTERNAL COMBUSTION ENGINE AND COOLING THE EXHAUST—METHOD USING SUCH A DEVICE

CROSS-REFERENCE TO RELATED APPLICATIONS

This application is a U.S. national phase application filed under 35 U.S.C. § 371 of International Application No. PCT/EP2016/060691, filed May 12, 2016, designating the United States, which claims priority from French Patent Application No. 15/54.834, filed May 28, 2015, which are hereby incorporated herein by reference in their entirety.

FIELD OF THE INVENTION

The present invention relates to a device for controlling the amount of air fed to the intake of a supercharged internal-combustion engine, notably a stationary engine or an automotive or industrial vehicle engine, and to a method of controlling the amount of air for such an engine, in particular when compressed air partial transfer ducts lead to the exhaust valves through the engine cylinder head.

BACKGROUND OF THE INVENTION

As it is widely known, the power delivered by an internal-combustion engine depends on the amount of fuel fed to the combustion chamber, which itself depends on the amount of air fed to the combustion chamber of this engine, this amount of air being also proportional to the density of this air.

Thus, it is usual to increase this amount of air through compression of the outside air before it is allowed into the combustion chamber. This operation, known as supercharging, can be carried out using any means such as a turbocharger or a driven compressor, which can be a centrifugal or a positive-displacement compressor.

In case of supercharging using a turbocharger, the latter comprises a rotary single-flow or double-flow turbine connected by a shaft to a rotary compressor. The exhaust gases from the engine flow through the turbine, which is then rotated. This rotation is thereafter transmitted to the compressor which, by its rotation, compresses the outside air before it is fed to the combustion chamber.

As is better described in French patent application No. 2,478,736, it is intended to increase the compression of the outside air by the compressor even further so as to be able to significantly raise this amount of compressed air in the compression chamber of the engine.

This is achieved in particular by increasing the rotational speed of the turbine and therefore of the compressor.

Part of the compressed air exiting the compressor is therefore diverted in order to be directly allowed to the turbine inlet while mixing with the exhaust gases. This turbine is then traversed by a larger amount of fluid (mixture of compressed air and exhaust gas), which allows the rotational speed of the turbine, and therefore of the compressor, to be increased. This compressor speed increase thus allows to raise the pressure of the outside air that is compressed in this compressor prior to being fed to the combustion chamber of the engine.

Thus, the compressed air has a higher density, which allows the amount of air contained in the combustion chamber to be increased.

This type of supercharged engine, although satisfactory, however involves some not insignificant drawbacks.

Indeed, the flow of compressed air admitted at the turbine inlet is not correctly controlled, which may lead to dysfunctional engines.

Thus, by way of example, in case of too large amounts of compressed air diverted to the turbine inlet, the exhaust gases entering the turbine are cooled too much by this air, which causes a decrease in the overall supercharging efficiency.

The present invention aims to overcome the aforementioned drawbacks with a device for controlling the amount of air fed to the intake of a supercharged internal-combustion engine which allows to meet all engine power requirements. Furthermore, the embodiment of the present invention is intended to make modifications to the engine cylinder head so that the compressed air partial transfer ducts lead to the vicinity of the exhaust valves, which in addition favours cooling thereof. The conventional compressed air loop is not modified.

The invention disclosed here also allows to conduct a compressed air transfer from the intake to the exhaust, even when the average pressure of the compressed air at the intake is lower than that of the gases at the exhaust. All that is needed is phases during the engine running cycle where the pressure at the intake is higher than the pressure prevailing at the exhaust.

SUMMARY OF THE INVENTION

Thus, the present invention relates to a device for controlling the amount of air fed to the intake of a supercharged internal-combustion engine, said engine comprising two exhaust gas outlets connected each to an exhaust manifold of a group of at least one cylinder, said device comprising a supercharging device including a turbocharger with a dual-inlet turbine connected to said exhaust gas outlets, as well as an outside air compressor, and at least one duct for partial transfer of the compressed air from the compressor to the turbine inlets, characterized in that the partial transfer duct opens into the engine cylinder head at an exhaust valve connected to the turbine inlets and it comprises throttling means controlling the transferred compressed air circulation.

The partial transfer duct can comprise a non-return valve (80, 82).

The device can comprise a partial transfer duct leading to the exhaust valves of each piston.

The partial transfer ducts can communicate with a connecting line diverting part of the compressed air at the compressor outlet.

The connecting line can comprise two branches connected to said partial transfer ducts.

The throttling means can comprise proportional valves.

The device can comprise means of controlling the proportional valves.

Said connecting line can comprise a bypass line for diversion to the intake line downstream from cooling and a three-way valve.

The invention also relates to a method of controlling the amount of compressed air fed to the intake of a supercharged internal-combustion engine, said engine comprising two exhaust gas outlets connected each to an exhaust manifold of a group of at least one cylinder, said device comprising a supercharging device including a turbocharger with a dual-inlet turbine connected to said exhaust gas outlets, as well as an outside air compressor, and at least one duct for partial transfer of the compressed air from the compressor to the turbine inlets, characterized in that it consists in leading said duct into the engine cylinder head at an exhaust valve connected to the turbine inlets and in feeding through said duct part of the compressed air from the compressor to the exhaust gas inlets of the turbine.

The method can consist in arranging a transfer duct at the valves of each piston and in controlling the compressed air circulation in each duct using throttling means.

The method can consist in controlling the temperature of the diverted air flow by means of a bypass line and of a three-way valve.

BRIEF DESCRIPTION OF THE FIGURES

Other features and advantages of the invention will be clear from reading the description hereafter, given by way of non limitative example, with reference to the accompanying figures wherein.

DETAILED DESCRIPTION OF THE INVENTION

Figure 1:
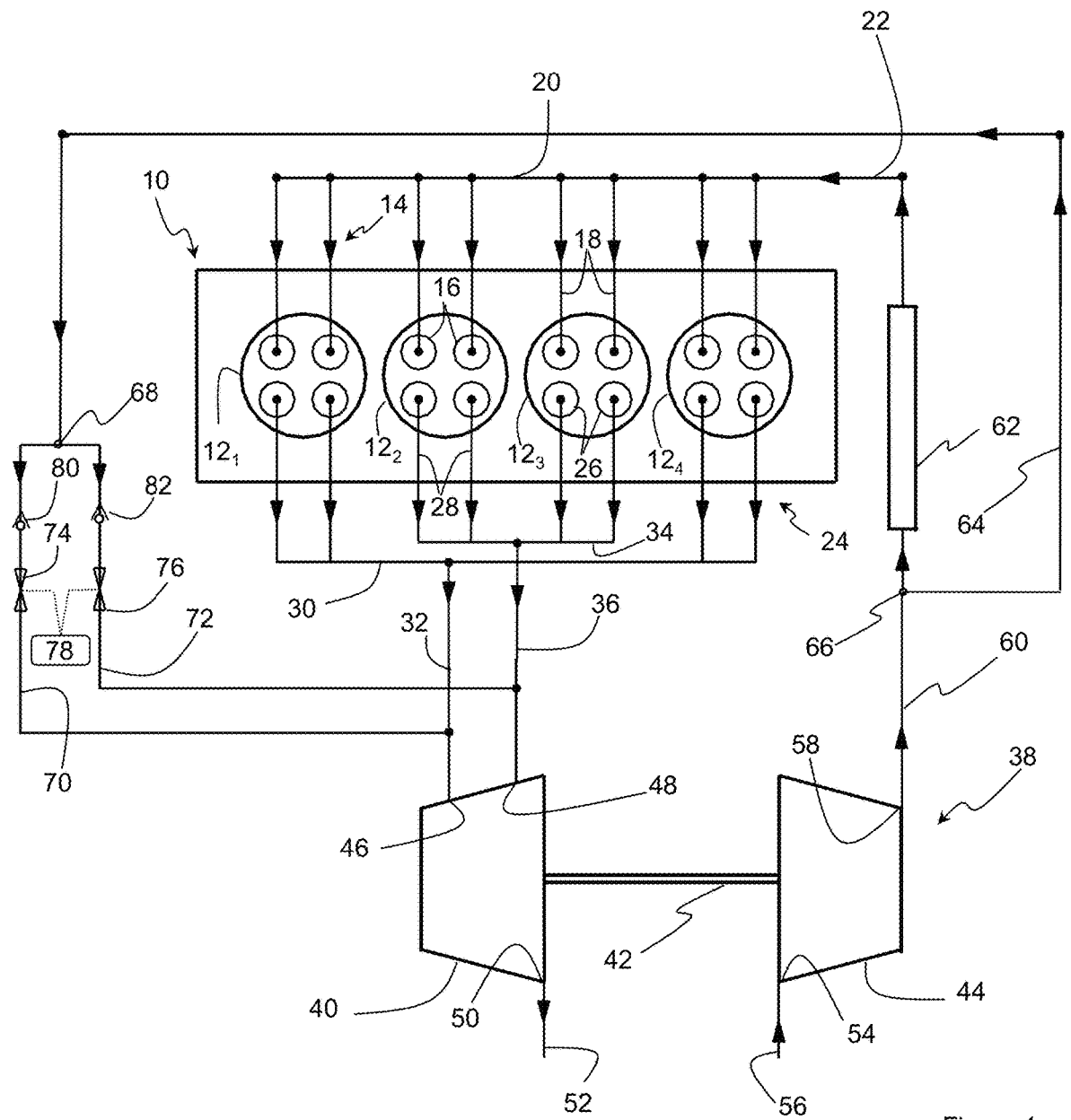
FIG. 1 illustrates an internal-combustion engine with a schematic representation of the principle of the supercharging device according to the invention.

In FIG. 1, internal-combustion engine 10 comprises at least two cylinders, here four cylinders with reference numerals $12_1$ to $12_4$ from the left of the figure.

Preferably, this engine is a direct-injection internal-combustion engine, notably of Diesel type, which by no means excludes any other type of internal-combustion engine.

Each cylinder comprises intake means 14 with at least one intake valve 16, here two intake valves controlling each an intake pipe 18. Intake pipes 18 lead to an intake manifold 20 supplied with intake air, such as compressed air, through a supply line 22.

This cylinder also comprises burnt gas exhaust means 24 with at least one exhaust valve 26, here also two valves controlling each an exhaust pipe 28.

In the example shown, the engine is designed to operate with a firing order 1-3-4-2. Considering this firing order, the exhaust pipes of first cylinder $12_1$ and second cylinder $12_4$ making up a first group of at least one cylinder are connected to a first exhaust manifold 30 with a first exhaust gas outlet 32. The exhaust pipes of the third and fourth cylinders $12_2$ and $12_3$ making up a second group of at least one cylinder are connected to a second exhaust manifold 34 comprising a second exhaust gas outlet 36.

The two exhaust gas outlets open into a turbocharger 38 for compression of the air and more particularly into expansion turbine 40 of this turbocharger.

As illustrated in FIG. 1, the turbocharger is a twin-scroll turbocharger.

This type of turbocharger comprises expansion turbine 40 scavenged by the exhaust gas, which is connected in rotation by a shaft 42 with a compressor 44.

At the turbine, the exhaust gas inlet is divided into two sections, a first inlet section 46 connected to first exhaust gas outlet 32 of first manifold 30 and a second inlet section 48 connected to second exhaust gas outlet 36 of second exhaust manifold 34.

Gas outlet 50 of turbine 40 is conventionally connected to exhaust line 52 of the engine.

Compressor 44 of turbocharger 38 comprises an outside air intake 54 supplied by a supply line 56. Compressed air outlet 58 of this compressor is connected to supply line 22 of intake manifold 20 by a duct 60.

Advantageously, a compressed air cooling radiator 62 may be provided on duct 60, between the compressor and line 22.

As is better seen in FIG. 1, a transfer duct 64 allows circulation of part of the compressed air from compressor 44 towards turbine inlets 46 and 48.

Figure 2:
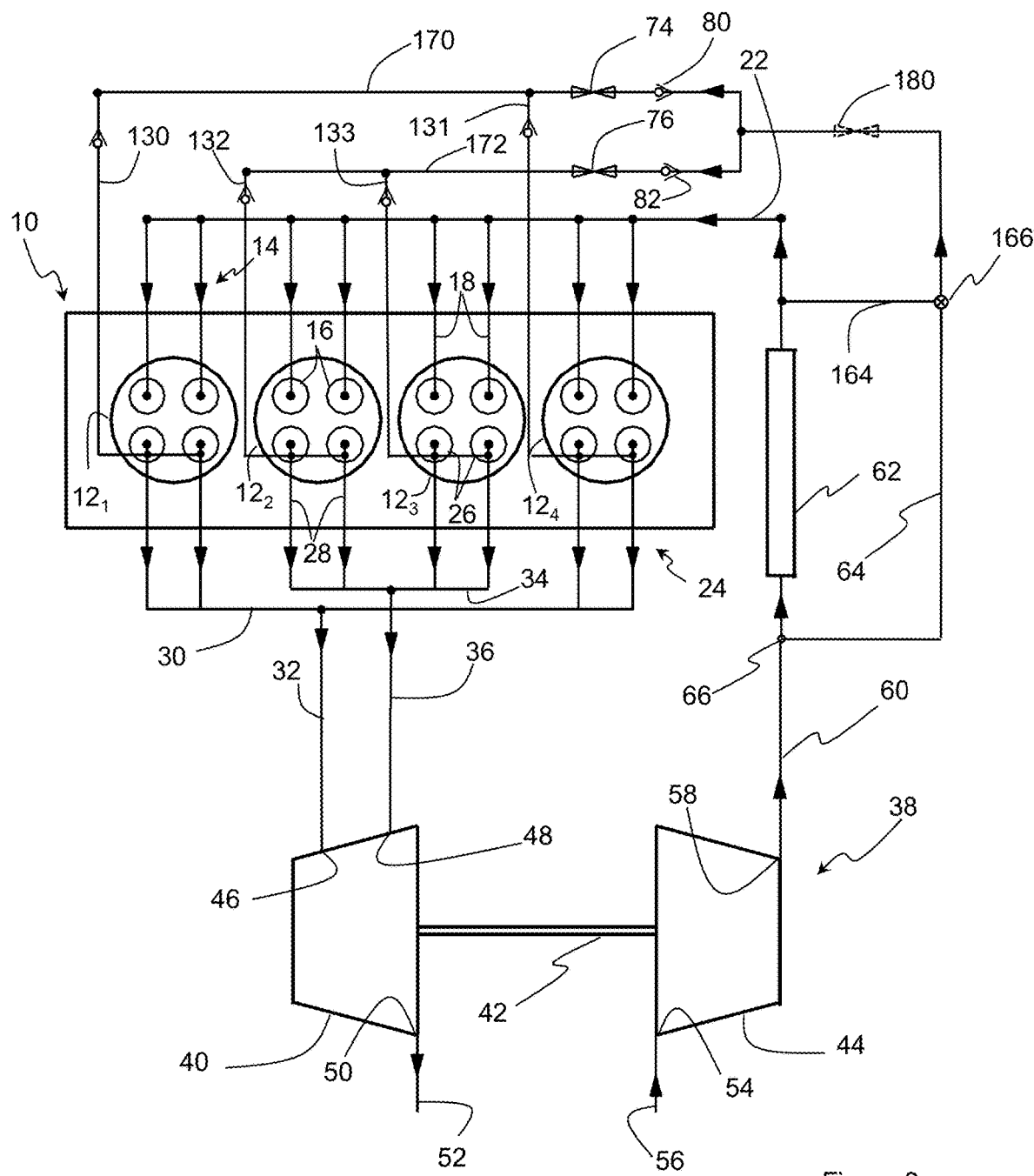
FIG. 2 shows more precisely an embodiment of the internal-combustion engine with its supercharging device comprising partial transfer ducts that directly lead to the exhaust valves.

This configuration shown in FIG. 1 allows to better understand the principle of the invention by describing clearly the various compressed air circuits; however, the present invention is preferably implemented according to FIG. 2 where the partial transfer or "scavenging" ducts lead to the exhaust valves, in the engine cylinder head.

In FIG. 1, the partial transfer duct originates from duct 60 at an intersection point 66 between the compressor and cooling radiator 62, and it divides at a bifurcation point 68 into two branches 70 and 72. Branch 70 leads to turbine inlet 46 through its junction with first exhaust gas outlet 32 and branch 72 leads to the other inlet 48 of this turbine through its junction with exhaust gas outlet 36.

Each branch carries throttling means 74 and 76, such as a proportional valve, controlled by a control means 78 that can be shared by the two throttling means. This valve thus allows to control the compressed air circulation in the branch.

Advantageously, each branch also comprises a non-return valve 80 and 82, which affords the advantage of being fast as it can open and close several times per engine cycle. This valve prevents compressed air circulation from the branch to the compressor while preventing communication between the two branches.

This configuration thus allows, during operation of the engine and at the engine cycle scale, to take advantage of the exhaust low-pressure zones occasionally prevailing in the exhaust manifolds in order to feed compressed air into the turbine and thus to increase the flow rate of this turbine, and therefore of the compressor. This also allows to achieve more efficient supercharging at low engine speeds.

During operation, in case a large amount of air is required in the cylinders, opening of valves 74 and 76 is controlled so as to feed compressed air from compressor 44 into turbine 40.

The compressed air exiting compressor 44 circulates in duct 64, then in branches 70 and 72 prior to reaching exhaust gas inlets 46 and 48 of turbine 40, thus providing surplus fluid supply to this turbine.

Thus, the turbine is traversed not only by the exhaust gases from outlets 32 and 36, but also by compressed air that comes on top of these gases. Therefore, the rotation of the turbine is increased, which causes an increase in the rotation of the compressor and, consequently, an increase in the pressure of the compressed air exiting this compressor.

Of course, valves 74 and 76 are controlled by control means 78 so as to allow the amount of compressed air into the turbine meeting the engine supercharging requirements.

FIG. 2 describes by way of example an embodiment according to the invention.

Here, the compressed air loop at the engine intake is not modified between the outlet of compressor 38 and intake pipes 18. Also, the exhaust loop, notably the part supplying turbine 40, is not modified.

The embodiment of the present invention relates to the presence of compressed air partial transfer ducts that open into the body of the engine cylinder head, at the exhaust valves. Thus, at each piston $12_1$, $12_2$, $12_3$, $12_4$, a partial transfer duct 130, 131, 132, 133 opens into the cylinder head at the exhaust valves.

The compressed air inlet arranged vertical to the valves through machining in the cylinder head favours cooling of the entire exhaust duct and notably of the valve rods.

Furthermore, the gases at the turbine inlets are better homogenized, thus preventing significant temperature gradients.

Finally, thermal losses of the entire exhaust duct and of the manifold are thus limited by lowering the temperature of the exhaust duct from the valves.

On the partial transfer ducts, an air flow control valve 76-74 and a non-return valve prevent exhaust gas reflux to the intake. This non-return valve can be arranged upstream or downstream from the control valve, or it can even be integrated in valve 76-74.

The compressed air partial transfer ducts leading to valves connected to the same manifold, 30 or 34, merge into a pipe 170-172 forming the two branches of bypass connecting line 64 downstream from compressor 44. The throttling means can consist of two valves 74-76, notably proportional valves, arranged each on the two branches 170 and 172. Both branches are equipped with non-return valves 80-82 preventing the exhaust gases from returning to the intake.

In a variant, a single valve 180, notably also a proportional valve, arranged on connecting line 64, allows to control the compressed air flow circulating in the partial transfer ducts.

In another variant, a bypass line 164 allows to send or to withdraw a compressed air flow controlled by a three-way valve 166 on connecting line 64. This bypass line allows to control the temperature of the scavenging compressed air by an air mixture upstream and downstream from supercharging air cooler 62.

Figure 3:
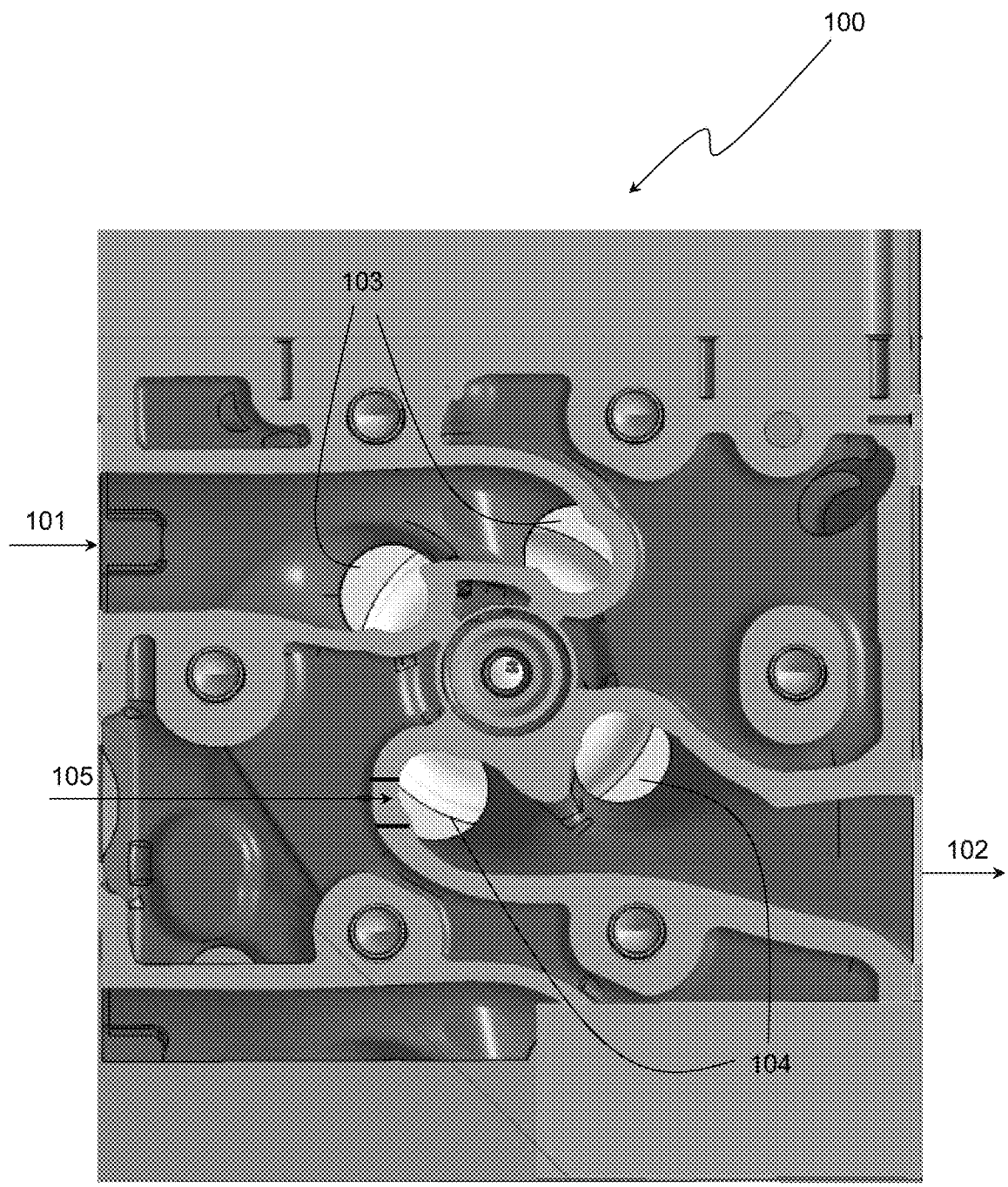
FIG. 3 shows an embodiment example of machining provided in the engine cylinder head.

FIG. 3 shows a schematic sectional view of cylinder head 100 of an engine. Reference numerals 101 and 102 respectively represent the intake and exhaust pipes leading to the intake 103 and exhaust 104 valves.

Arrow 105 schematically illustrates the machining of the inlet of a partial transfer duct at the exhaust valves. Depending on the cylinder head type, this machining operation can consist in drilling or it can be provided when casting the cylinder head.

This diagram shows a valve arrangement as typically encountered with industrial engines. It is thus possible to readily integrate an air inlet as mentioned above.

The embodiments are not limited to those described by way of example in FIG. 2, other equivalent arrangements of transfer ducts in the cylinder head can be considered, depending notably on the cylinder head or engine type.

An inlet can notably be provided for the diverted air flow in a sole placed right next to the cylinder head at the cylinder head outlet, with an air guide path towards the inside of the duct through specific machining or piping.

The invention claimed is:

1. A device for controlling an amount of air fed to an intake of a supercharged internal-combustion engine, the engine comprising two exhaust gas outlets connected each to an exhaust manifold of a group of at least one cylinder, the device comprising:
    a supercharging device including a turbocharger comprising a turbine including two inlets connected to the exhaust gas outlets, and an outside air compressor,
    at least one duct for partial transfer of compressed air from the compressor to the inlets of the turbine, wherein the at least one duct comprises a duct opening into an engine cylinder head at an exhaust valve connected to the inlets of the turbine, wherein the at least one duct communicates with a connecting line diverting a part of the compressed air at an outlet of the compressor, and the connecting line comprises a bypass line for diversion to an intake line downstream from cooling, and a three-way valve,
    at least one proportional valve for controlling transferred compressed air circulation, and
    a controller for controlling the at least one proportional valve.

2. The device as claimed in claim 1, wherein the at least one duct comprises a non-return valve.

3. The device as claimed in claim 2, wherein the at least one duct comprises the at least one proportional valve.

4. The device as claimed in claim 1, wherein the at least one duct comprises ducts leading to exhaust valves of each piston.

5. The device as claimed in claim 1, wherein the connecting line comprises two branches connected to the at least one duct.

6. The device as claimed in claim 1 wherein the at least one duct comprises the at least one proportional valve.

7. A method of controlling an amount of compressed air fed to an intake of a supercharged internal-combustion engine, the engine comprising two exhaust gas outlets connected each to an exhaust manifold of a group of at least one cylinder, a device comprising a supercharging device including a turbocharger comprising a turbine including two inlets connected to the exhaust gas outlets, and an outside air compressor, at least one duct for partial transfer of the compressed air from the compressor to the inlets of the turbine, the at least one duct comprising a duct opening into an engine cylinder head at an exhaust valve connected to the inlets of the turbine, at least one proportional valve, and a controller for controlling the at least one proportional valve, wherein the at least one duct communicates with a connecting line diverting a part of the compressed air at an outlet of the compressor, and the connecting line comprises a bypass line for diversion to an intake line downstream from cooling, and a three-way valve, the method comprising:
    feeding a part of the compressed air from the compressor through the at least one duct and to the inlets of the turbine.

8. The method as claimed in claim 7, wherein the at least one duct comprises a transfer duct arranged at the valves of each piston and circulation of the compressed air is controlled in each transfer duct using the at least one proportional valve.

9. The method as claimed in claim 7, wherein temperature of diverted air flow is controlled by a conveyance structure comprising the bypass line and the three-way valve.

10. The method as claimed in claim 7, wherein temperature of diverted air flow is controlled by means of the bypass line and the three-way valve.

\* \* \* \* \*